(12) United States Patent
Sundararajan et al.

(10) Patent No.: US 11,412,521 B1
(45) Date of Patent: Aug. 9, 2022

(54) MACHINE LEARNING AIDED LOCATION-BASED DOWNLINK INTERFERENCE ASSISTANCE INFORMATION

(71) Applicant: QUALCOMM Incorporated, San Diego, CA (US)

(72) Inventors: Jay Kumar Sundararajan, San Diego, CA (US); Yeliz Tokgoz, San Diego, CA (US); Taesang Yoo, San Diego, CA (US); Naga Bhushan, San Diego, CA (US); Hwan Joon Kwon, San Diego, CA (US); Krishna Kiran Mukkavilli, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/190,262

(22) Filed: Mar. 2, 2021

(51) Int. Cl.
*H04W 72/08* (2009.01)
*H04W 72/04* (2009.01)

(52) U.S. Cl.
CPC ....... *H04W 72/082* (2013.01); *H04W 72/044* (2013.01); *H04W 72/048* (2013.01); *H04W 72/0413* (2013.01)

(58) Field of Classification Search
CPC .............................. H04W 24/10; H04L 67/18
See application file for complete search history.

(56) References Cited

U.S. PATENT DOCUMENTS

| 2015/0288505 | A1 | 10/2015 | Park et al. |
| 2017/0064615 | A1* | 3/2017 | Im .......................... H04B 15/00 |
| 2017/0188371 | A1 | 6/2017 | Kim et al. |

FOREIGN PATENT DOCUMENTS

WO    WO-2020087260 A1    5/2020

OTHER PUBLICATIONS

International Search Report and Written Opinion—PCT/US2022/015138—ISA/EPO—dated May 13, 2022.
Mediatek Inc: "UE-Based Interference Mitigation for Rel-17", 3GPP Draft, 3GPP TSG RAN Meeting#84, RP-191098, UE Based IM, 3rd Generation Partnership Project (3GPP), Mobile Competence Centre, 650, Route Des Lucioles, F-06921 Sophia-Antipolis Cedex, France, vol. TSG RAN, No. Newport beach, CA, USA, Jun. 3, 2019-Jun. 6, 2019, Jun. 2, 2019 (Jun. 2, 2019), XP051747312, 5 Pages, Retrieved from the Internet: URL: http://www.3gpp.org/ftp/Meetings%5F3GPP%5FSYNC/RAN/Docs/RP%2D191098%2Ezip [Retrieved on Jun. 2, 2019] p. 1-p. 4.

* cited by examiner

*Primary Examiner* — Kevin Kim
(74) *Attorney, Agent, or Firm* — Seyfarth Shaw LLP

(57) ABSTRACT

A method of wireless communications by a user equipment (UE) includes receiving location-based downlink interference assistance information according to a current geolocation of the UE. The method also includes estimating downlink interference according to the location-based downlink interference assistance information.

30 Claims, 10 Drawing Sheets

MACHINE LEARNING AIDED LOCATION-BASED DOWNLINK INTERFERENCE ASSISTANCE INFORMATION

FIELD OF THE DISCLOSURE

Aspects of the present disclosure generally relate to wireless communications, and more particularly to techniques and apparatuses for an enhancement to location-based downlink interference assistance information through machine learning.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

Artificial neural networks may comprise interconnected groups of artificial neurons (e.g., neuron models). The artificial neural network may be a computational device or represented as a method to be performed by a computational device. Convolutional neural networks, such as deep convolutional neural networks, are a type of feed-forward artificial neural network. Convolutional neural networks may include layers of neurons that may be configured in a tiled receptive field. It would be desirable to apply neural network processing to wireless communications to achieve greater efficiencies.

SUMMARY

A method of wireless communications by a user equipment (UE) includes receiving location-based downlink interference assistance information according to a current geolocation of the UE. The method also includes estimating downlink interference according to the location-based downlink interference assistance information.

A method of wireless communications by a network device is described. The method includes learning downlink interference information for a plurality of geolocations. The method also includes detecting at least one user equipment (UE) at one of the plurality of geolocations. The method further includes transmitting, to the UE, location-based downlink interference assistance information according to a current geolocation of the UE.

An apparatus for wireless communications by a user equipment (UE) is described. The apparatus includes means for receiving location-based downlink interference assistance information according to a current geolocation of the UE. The apparatus also includes means for estimating downlink interference according to the location-based downlink interference assistance information.

A user equipment (UE) includes a processor and a memory coupled with the processor. The UE also includes instructions stored in the memory. When the instructions are executed by the processor, the UE is operable to receive location-based downlink interference assistance information according to a current geolocation of the UE. The UE is also operable to estimate downlink interference according to the location-based downlink interference assistance information.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description, may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
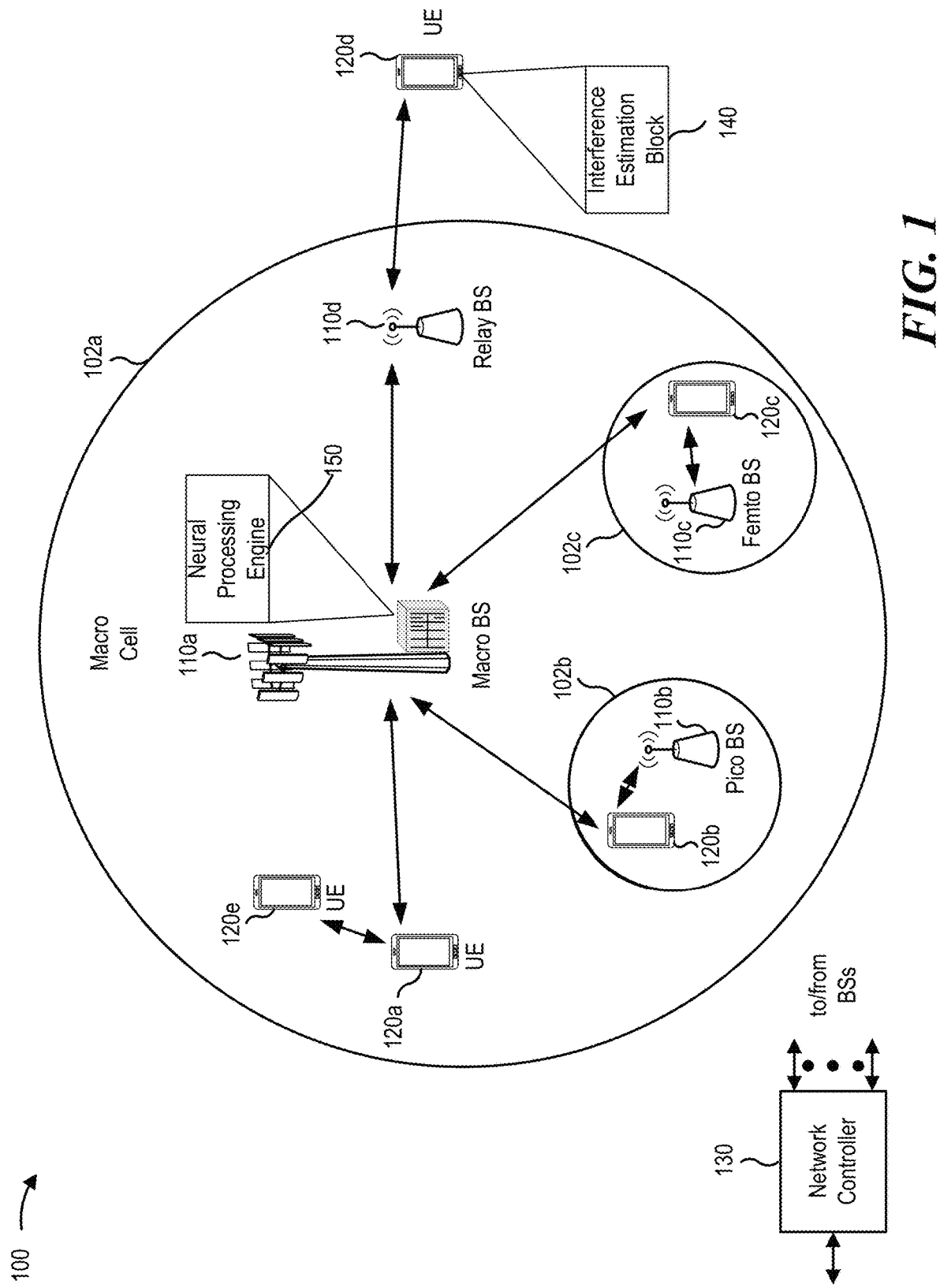
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

Inter-cell interference may result in signal, for example, signal to interference plus noise ratio (SINR), degradation for users. The signal degradation for users is especially significant when a user is at a cell edge. In addition, due to introduction of massive multiple-input multiple-output (MIMO) antennas in next generation node Bs (gNBs), this inter-cell interference may be highly directional and highly variant with time. Unfortunately, high directional interference at the cell edge may reduce the data rate and negatively impact user experience. Furthermore, high variance in the interference makes it more difficult to perform link adaptation, such as predicting a supportable modulation and coding scheme (MCS). This may be challenging for latency sensitive applications, which have a limited delay budget. This limited delay budget may be insufficient to recover packets through hybrid automatic repeat request (HARQ) procedures when a selected modulation and coding scheme (MCS) is not accurate.

For a user equipment (UE) with multiple receive antennas (e.g., 2, 4, or 8 antennas), an inter-cell interference spatial structure may be inferred and accounted for (e.g., interference nulling) during demodulation. For example, a UE may estimate downlink interference covariance across its antennas using a demodulation reference signal (DMRS). In operation, the interference spatial structure experienced by the UE may be resolved into two components: (1) a spatial structure in a global coordinate system resulting from the directionality of incoming interference; and (2) a projection of this interference onto the antennas of the UE. The projection of this interference onto the antennas of the UE depends on: (A) an orientation of the UE; and (B) an arrangement of antennas in the UE.

An existing technique for addressing downlink interference specifies that each UE estimates a downlink interference structure from scratch in each slot. The spatial structure (e.g., direction of arrival) of interference at a given location may have some long-term properties when viewed in a global coordinate system. In particular, a beneficial mechanism that learns these long-term properties, possibly as a function of the location, and then supplies this information when a UE visits the location is desirable. In this example, projection of the long-term properties onto the UE's antennas may be carried out in a UE-specific manner to enable interference nulling during signal demodulation.

Aspects of the present disclosure are directed to a network trained to learn a location-based, spatial structure of interference to improve estimation of an inter-cell interference spatial structure. In these aspects of the present disclosure, for a given location, the network learns an incoming direction and strength of interference at that location based on historical channel state information (CSI) feedback. For example, an inter-cell interference spatial structure may be learned using machine learning techniques. In this example, the network determines the location of a given UE. Based on the UE's location, the network determines the direction of incoming interference. The UE's location may be based on a current geolocation of a UE. In practice, there may be more than one potential direction of interference due to reflectors. In addition, the dominant interference direction(s) may change across time slots or frequency resources, potentially due to scheduling decisions of neighbor cells.

According to aspects of the present disclosure, determination of the dominant interference direction may involve coordination with other cells. For example, coordinating with another network device at another cell may be performed to determine the incoming direction of the dominant interference. In this example, the cells may convey information on what pre-coder/beam the cell uses for different resources. The network then transmits location-based downlink interference assistance information to the UE about the determined downlink interference. For example, the network may multicast the location-based downlink interference assistance information to a group of UEs in a predetermined direction from the network device or in a geographic zone. In some aspects, the UE may estimate the downlink interference according to the location-based downlink interference assistance information received from the network. Once determined, the UE may project the incoming direction of the downlink interference onto the antennas of the UE, taking into account the device orientation and arrangement of the antennas. For example, demodulating data by the UE may be performed using the location-based downlink interference assistance information received from the network.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit and receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. The network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

The UEs 120 may include an interference estimation block 140. For brevity, only one UE 120d is shown as including the interference estimation block 140. The interference estimation block 140 may receive location-based downlink interference assistance information according to a current geolocation of the UE. The interference estimation block 140 may also estimate downlink interference according to the location-based downlink interference assistance information.

The base stations 110 may include a neural processing engine 150. For brevity, only one base station 110a is shown as including the neural processing engine 150. The neural processing engine 150 may learn downlink interference information for a plurality of geolocations. The method also includes detecting at least one user equipment (UE) at one of the plurality of geolocations. The neural processing engine 150 may also transmit, to the UE, location-based downlink interference assistance information according to a current geolocation of the UE.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE), or via system information (e.g., a system information block (SIB)).

As indicated above, FIG. 1 is provided merely as an example. Other examples may differ from what is described with regard to FIG. 1.

Figure 2:
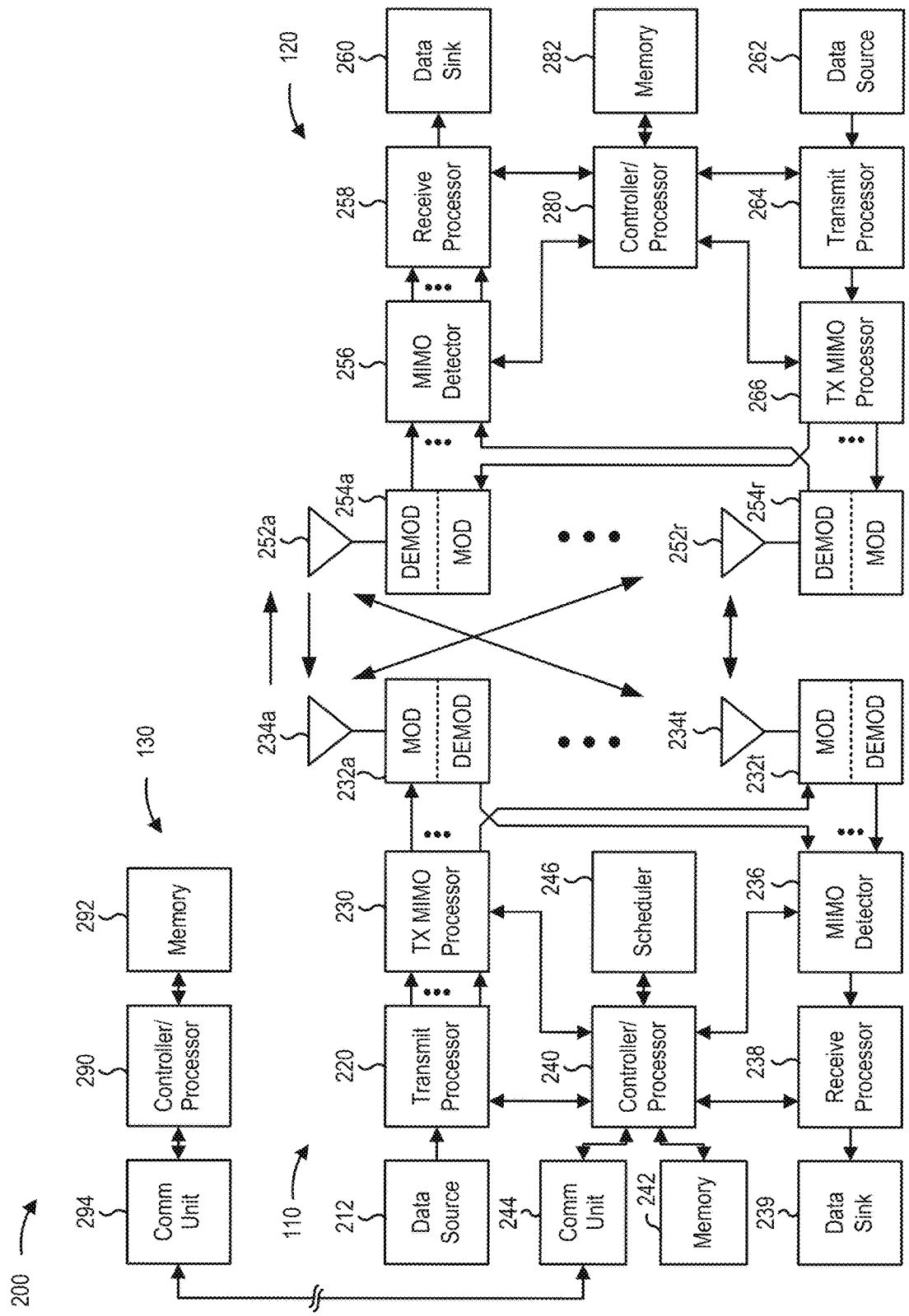
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the network controller 130 via the communications unit 244. The network controller 130 may include a communications unit 294, a controller/processor 290, and a memory 292.

The controller/processor 240 of the base station 120, and/or the controller/processor 280 of the UE 120 of FIG. 2 may perform one or more techniques associated with machine learning for predicting location-based downlink interference assistance information for the UE 120, as described in more detail elsewhere. For example, the controller/processor 280 of the UE 120 of FIG. 2 may perform or direct operations of, for example, the processes of FIG. 8 and/or other processes as described. In addition, the controller/processor 240 of the base station 110 of FIG. 2 may perform or direct operations of, for example, the process of FIG. 9 and/or other processes as described. Memories 242 and 282 may store data and program codes for the base station 110 and UE 120, respectively. A scheduler 246 may schedule UEs for data transmission on the downlink and/or uplink.

In some aspects, base station 110 and the UE 120 may include means for receiving, means for estimating downlink, means for learning, means for detecting, and/or means for transmitting. Such means may include one or more components of the UE 120 or base station 110 described in connection with FIG. 2.

As indicated above, FIG. 2 is provided merely as an example. Other examples may differ from what is described with regard to FIG. 2.

In some cases, different types of devices supporting different types of applications and/or services may coexist in a cell. Examples of different types of devices include UE handsets, customer premises equipment (CPEs), vehicles, Internet of Things (IoT) devices, and/or the like. Examples of different types of applications include ultra-reliable low-latency communications (URLLC) applications, massive machine-type communications (mMTC) applications, enhanced mobile broadband (eMBB) applications, vehicle-to-everything (V2X) applications, and/or the like. Furthermore, in some cases, a single device may support different applications or services simultaneously.

Figure 3:
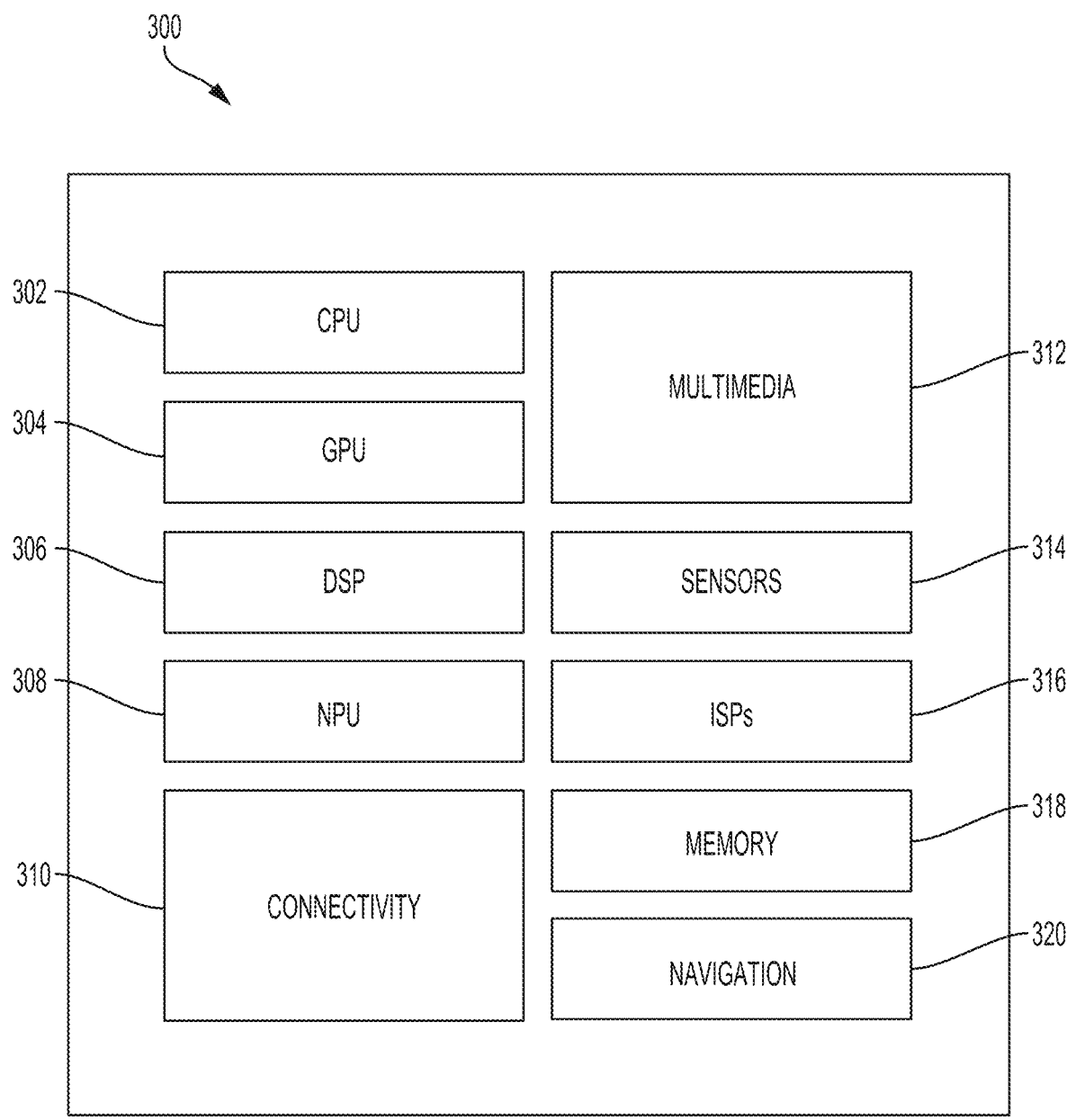
FIG. 3 illustrates an example implementation of designing a neural network using a system-on-a-chip (SOC), including a general-purpose processor, in accordance with certain aspects of the present disclosure.

FIG. 3 illustrates an example implementation of a system-on-a-chip (SOC) 300, which may include a central processing unit (CPU) 302 or a multi-core CPU configured for generating gradients for neural network training, in accordance with certain aspects of the present disclosure. The SOC 300 may be included in the base station 110 or UE 120. Variables (e.g., neural signals and synaptic weights), system parameters associated with a computational device (e.g., neural network with weights), delays, frequency bin information, and task information may be stored in a memory block associated with a neural processing unit (NPU) 308, in a memory block associated with a CPU 302, in a memory block associated with a graphics processing unit (GPU) 304, in a memory block associated with a digital signal processor (DSP) 306, in a memory block 318, or may be distributed across multiple blocks. Instructions executed at the CPU 302 may be loaded from a program memory associated with the CPU 302 or may be loaded from a memory block 318.

The SOC 300 may also include additional processing blocks tailored to specific functions, such as a GPU 304, a DSP 306, a connectivity block 310, which may include fifth generation (5G) connectivity, fourth generation long term evolution (4G LTE) connectivity, Wi-Fi connectivity, USB connectivity, Bluetooth connectivity, and the like, and a multimedia processor 312 that may, for example, detect and recognize gestures. In one implementation, the NPU is implemented in the CPU, DSP, and/or GPU. The SOC 300 may also include a sensor processor 314, image signal processors (ISPs) 316, and/or navigation module 320, which may include a global positioning system.

The SOC 300 may be based on an ARM instruction set. In an aspect of the present disclosure, the instructions loaded into the general-purpose processor 302 may comprise program code to receive location-based downlink interference assistance information according to a current geolocation of the UE; and program code to estimate downlink interference according to the location-based downlink interference assistance information.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 4A:
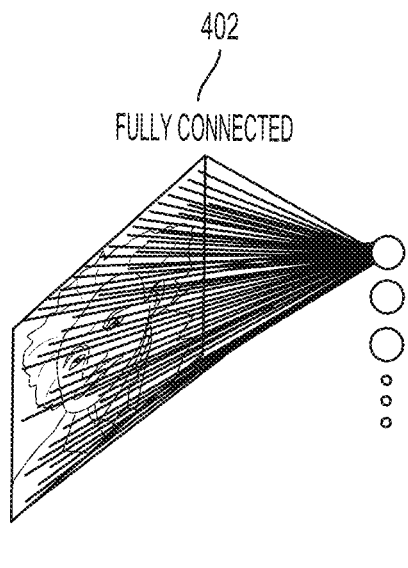
FIGS. 4A, 4B, and 4C are diagrams illustrating a neural network, in accordance with aspects of the present disclosure.
Figure 4B:
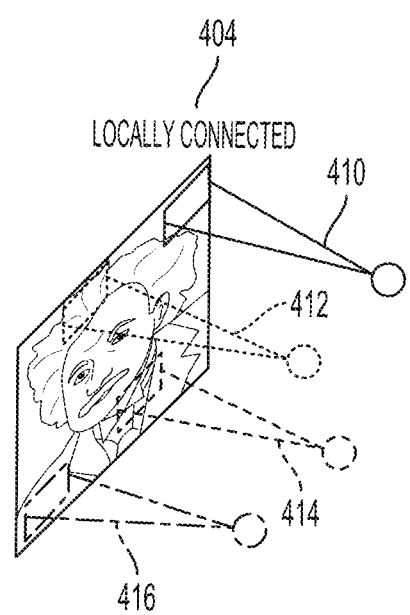

The connections between layers of a neural network may be fully connected or locally connected. FIG. 4A illustrates an example of a fully connected neural network 402. In a fully connected neural network 402, a neuron in a first layer may communicate its output to every neuron in a second layer, so that each neuron in the second layer will receive input from every neuron in the first layer. FIG. 4B illustrates an example of a locally connected neural network 404. In a locally connected neural network 404, a neuron in a first layer may be connected to a limited number of neurons in the second layer. More generally, a locally connected layer of the locally connected neural network 404 may be configured so that each neuron in a layer will have the same or a similar connectivity pattern, but with connections strengths that may have different values (e.g., 410, 412, 414, and 416). The locally connected connectivity pattern may give rise to spatially distinct receptive fields in a higher layer, because the higher layer neurons in a given region may receive inputs that are tuned through training to the properties of a restricted portion of the total input to the network.

Figure 4C:
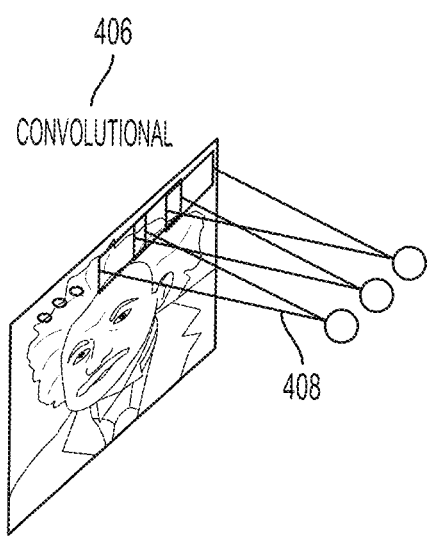

One example of a locally connected neural network is a convolutional neural network. FIG. 4C illustrates an example of a convolutional neural network 406. The convolutional neural network 406 may be configured such that the connection strengths associated with the inputs for each neuron in the second layer are shared (e.g., 408). Convolutional neural networks may be well suited to problems in which the spatial location of inputs is meaningful.

Figure 4D:
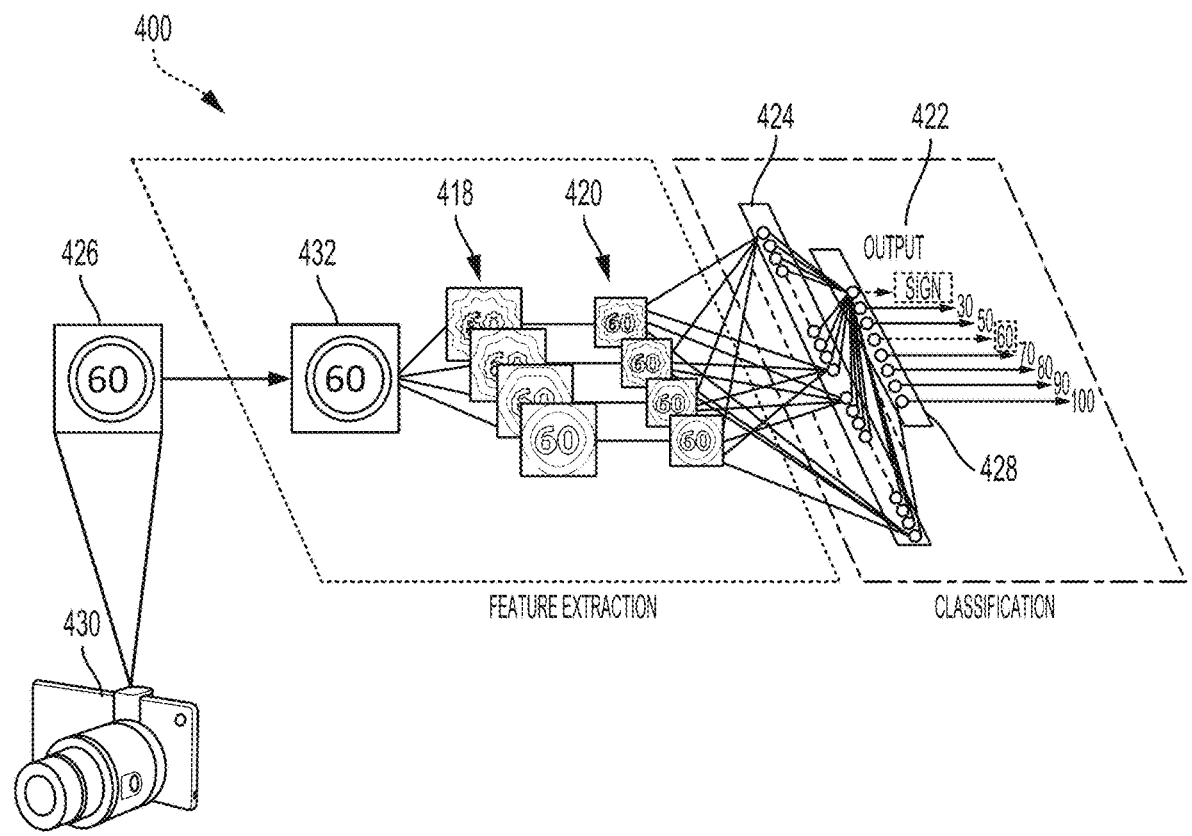
FIG. 4D is a diagram illustrating an exemplary deep convolutional network (DCN), in accordance with aspects of the present disclosure.

One type of convolutional neural network is a deep convolutional network (DCN). FIG. 4D illustrates a detailed example of a DCN 400 designed to recognize visual features from an image 426 input from an image capturing device 430, such as a car-mounted camera. The DCN 400 of the current example may be trained to identify traffic signs and a number provided on the traffic sign. Of course, the DCN 400 may be trained for other tasks, such as identifying lane markings or identifying traffic lights.

The DCN 400 may be trained with supervised learning. During training, the DCN 400 may be presented with an image, such as the image 426 of a speed limit sign, and a forward pass may then be computed to produce an output 422. The DCN 400 may include a feature extraction section and a classification section. Upon receiving the image 426, a convolutional layer 432 may apply convolutional kernels (not shown) to the image 426 to generate a first set of feature maps 418. As an example, the convolutional kernel for the convolutional layer 432 may be a 5×5 kernel that generates 28×28 feature maps. In the present example, because four different feature maps are generated in the first set of feature maps 418, four different convolutional kernels were applied to the image 426 at the convolutional layer 432. The convolutional kernels may also be referred to as filters or convolutional filters.

The first set of feature maps 418 may be subsampled by a max pooling layer (not shown) to generate a second set of feature maps 420. The max pooling layer reduces the size of the first set of feature maps 418. That is, a size of the second set of feature maps 420, such as 14×14, is less than the size of the first set of feature maps 418, such as 28×28. The reduced size provides similar information to a subsequent layer while reducing memory consumption. The second set of feature maps 420 may be further convolved via one or more subsequent convolutional layers (not shown) to generate one or more subsequent sets of feature maps (not shown).

In the example of FIG. 4D, the second set of feature maps 420 is convolved to generate a first feature vector 424. Furthermore, the first feature vector 424 is further convolved to generate a second feature vector 428. Each feature of the second feature vector 428 may include a number that corresponds to a possible feature of the image 426, such as "sign," "60," and "100." A softmax function (not shown) may convert the numbers in the second feature vector 428 to a probability. As such, an output 422 of the DCN 400 is a probability of the image 426 including one or more features.

In the present example, the probabilities in the output 422 for "sign" and "60" are higher than the probabilities of the others of the output 422, such as "30," "40," "50," "70," "80," "90," and "100". Before training, the output 422 produced by the DCN 400 is likely to be incorrect. Thus, an error may be calculated between the output 422 and a target output. The target output is the ground truth of the image 426 (e.g., "sign" and "60"). The weights of the DCN 400 may then be adjusted so the output 422 of the DCN 400 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images (e.g., the speed limit sign of the image 426) and a forward pass through the network may yield an output 422 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 5:
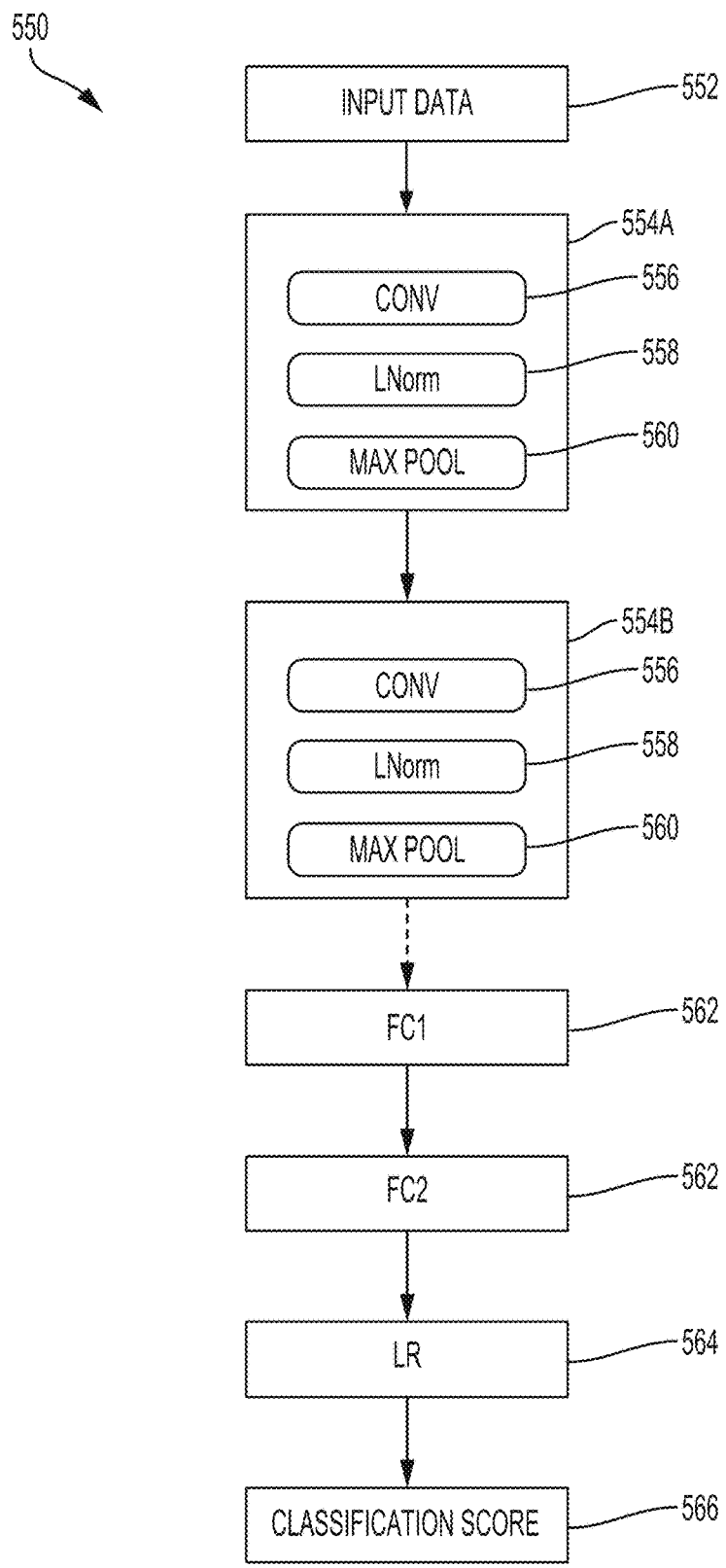
FIG. 5 is a block diagram illustrating an exemplary deep convolutional network (DCN), in accordance with aspects of the present disclosure.

FIG. 5 is a block diagram illustrating a deep convolutional network 550. The deep convolutional network 550 may include multiple different types of layers based on connectivity and weight sharing. As shown in FIG. 5, the deep convolutional network 550 includes the convolution blocks 554A, 554B. Each of the convolution blocks 554A, 554B may be configured with a convolution layer (CONV) 356, a normalization layer (LNorm) 558, and a max pooling layer (MAX POOL) 560.

The convolution layers 556 may include one or more convolutional filters, which may be applied to the input data to generate a feature map. Although only two of the convolution blocks 554A, 554B are shown, the present disclosure is not so limiting, and instead, any number of the convolution blocks 554A, 554B may be included in the deep convolutional network 550 according to design preference. The normalization layer 558 may normalize the output of the convolution filters. For example, the normalization layer 558 may provide whitening or lateral inhibition. The max pooling layer 560 may provide down sampling aggregation over space for local invariance and dimensionality reduction.

The parallel filter banks, for example, of a deep convolutional network may be loaded on a CPU 302 or GPU 304 of an SOC 300 to achieve high performance and low power consumption. In alternative embodiments, the parallel filter banks may be loaded on the DSP 306 or an ISP 316 of an SOC 300. In addition, the deep convolutional network 550 may access other processing blocks that may be present on the SOC 300, such as sensor processor 314 and navigation module 320, dedicated, respectively, to sensors and navigation.

The deep convolutional network 550 may also include one or more fully connected layers 562 (FC1 and FC2). The deep convolutional network 550 may further include a logistic regression (LR) layer 564. Between each layer 556, 558, 560, 562, 564 of the deep convolutional network 550 are weights (not shown) that are to be updated. The output of each of the layers (e.g., 556, 558, 560, 562, 564) may serve as an input of a succeeding one of the layers (e.g., 556, 558, 560, 562, 564) in the deep convolutional network 550 to learn hierarchical feature representations from input data 552 (e.g., images, audio, video, sensor data and/or other input data) supplied at the first of the convolution blocks 554A. The output of the deep convolutional network 550 is a classification score 566 for the input data 552. The classification score 566 may be a set of probabilities, where each probability is the probability of the input data, including a feature from a set of features.

As indicated above, FIGS. 3-5 are provided as examples. Other examples may differ from what is described with respect to FIGS. 3-5.

As described above, inter-cell interference may result in signal (e.g., signal to interference plus noise ratio (SINR)) degradation for users. The signal degradation for users may be especially significant when a user is at a cell edge. In addition, due to introduction of massive multiple-input multiple-output (MIMO) antennas in next generation base stations (e.g., gNBs), this inter-cell interference may be highly directional and highly variant with time. Unfortunately, high directional interference at the cell edge may significantly reduce the data rate and negatively impact user experience. Furthermore, high variance in the interference makes it more difficult to perform link adaptation, such as predicting a supportable modulation and coding scheme (MCS). This is challenging for latency sensitive applications, which have a limited delay budget. This limited delay budget may be insufficient to recover packets through hybrid automatic repeat request (HARQ) procedures when a selected modulation and coding scheme (MCS) is not accurate.

For a user equipment (UE) with multiple receive antennas (e.g., 2, 4, or 8 antennas), an inter-cell interference spatial structure may be inferred and accounted for (e.g., interference nulling) during demodulation. For example, a UE may estimate downlink interference covariance across its antennas using a demodulation reference signal (DMRS). In operation, the interference spatial structure experienced by the UE may be resolved into two components: (1) a spatial structure in a global coordinate system resulting from the directionality of incoming interference; and (2) a projection of this interference onto the antennas of the UE. The projection of this interference onto the antennas of the UE depends on: (A) an orientation of the UE; and (B) an arrangement of antennas in the UE.

An existing technique for addressing downlink interference specifies that each UE estimates a downlink interference structure from scratch in each slot. The spatial structure (e.g., direction of arrival) of interference at a given location may have some long-term properties when viewed in a global coordinate system. In particular, a beneficial mechanism that learns these long-term properties, possibly as a function of the location, and then supplies this information when a UE visits the location is desirable. In this example, projection of the long-term properties onto the UE's antenna may be carried out in a UE-specific manner to enable interference nulling during signal demodulation, for example.

Aspects of the present disclosure are directed to a network trained to learn a location-based, spatial structure of interference to improve estimation of an inter-cell interference spatial structure. In these aspects of the present disclosure, for a given location, the network learns an incoming direction and strength of interference at that location based on historical channel state information (CSI) feedback, for example. An inter-cell interference spatial structure may be learned with machine learning techniques. In this example, the network determines the location of a given UE. Based on the UE's location, the network determines the direction(s) of incoming interference. In practice, there may be more than one potential direction of interference due to reflectors. In addition, the dominant interference direction(s) may change across time slots or frequency resources.

According to aspects of the present disclosure, determination of the dominant interference direction may involve coordination with other cells. For example, the cells may convey information on what pre-coder/beam the cell uses for different resources. The network then transmits location-based downlink interference assistance information to the UE about the determined downlink interference. In some aspects, the UE estimates the downlink interference according to the location-based downlink interference assistance information received from the network. Once determined, the UE may project the incoming direction of the downlink interference onto the antennas of the UE, taking into account the device orientation and arrangement of the antennas. In one configuration, the prediction of the location-based interference assistance information is performed using machine learning with a neural processing engine (NPE), for example, as shown in FIG. 6.

Figure 6:
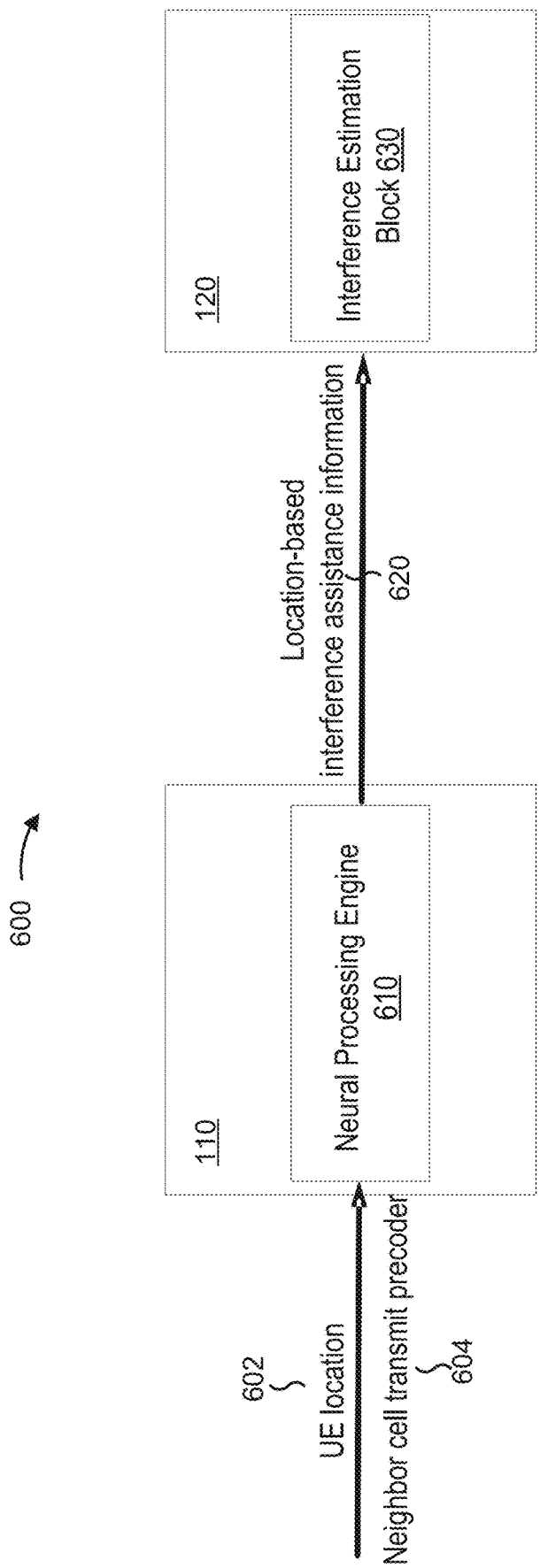
FIG. 6 is a block diagram of a network including a neural processing engine configured to learn a location-based, spatial structure of interference experienced by a wireless device, according to aspects of the present disclosure.

FIG. 6 is a block diagram of a network 600 including a neural processing engine 610 configured to learn a location-based, spatial structure of interference experienced by a UE 120, according to aspects of the present disclosure. The network 600 is composed of a UE 120 and a base station 110. In these aspects of the present disclosure, the neural processing engine (NPE) 610 learns an incoming direction and strength of interference at a location based on historical channel state information (CSI) feedback, for example. Although, FIG. 6 illustrates the role of the network 600 played by the base station 110, a location server, an interference management server, or other server or other form of network entity may provide location-based interference assistance information 620. The location-based interference assistance information 620 may be addressed to a specific UE or each UE within a geographic zone or direction using a multicast communication based on the determination that the assistance information is common to the UEs within that zone.

In some aspects, the neural processing engine 610 is trained to predict a spatial interference pattern at a location of a UE 120 using machine learning techniques. For example, the neural processing engine 610 may receive the location of a given UE 120 in a UE location message 602. Based on the UE location message 602, the neural processing engine 610 predicts the direction of incoming interference relative to the UE location. According to this aspect of the present disclosure, the predicted spatial interference pattern at a location of the UE 120, is provided to the UE 120 as location-based interference assistance information 620. In this example, a predicted spatial interference pattern at a location of the UE 120 is provided to an interference estimation block 630 of the UE 120. In these aspects of the present disclosure, the interference estimation block 630 of the UE 120 computes downlink interference at the UE 120 using the location-based interference assistance information 620. The process may be performed by selecting an array of antennas of the UE 120 based on the location-based interference assistance information 620. The UE 120 may include multiple antenna arrays (or panels), which may be located at different sides of the UE 120 to receive signals from different paths.

In practice, there may be more than one potential direction of interference due to reflectors. In addition, the dominant interference direction(s) may change across time slots or frequency resources. According to aspects of the present disclosure, determination of the dominant interference direction may involve coordination with other cells. For example, neighbor cells may convey information on what pre-coder/beam the cell uses for different resources. In this example, the UE location message 602 and a neighbor cell transmit pre-coder message 604 are provided to the neural processing engine 610. The neural processing engine 610 determines the dominant interference direction(s) based on the UE location message 602 and the neighbor cell transmit pre-coder message 604.

The neural processing engine 610 may determine the dominant downlink interferer and then transmit location-based interference assistance information 620 to the UE 120 about the determined downlink interference. The UE 120 may use this information for channel-state feedback or for demodulating received data, for example. In some aspects, the interference estimation block 630 of the UE 120 estimates the downlink interference according to the location-based interference assistance information 620 received from the neural processing engine 610. Once determined, the UE 120 may project the incoming direction of the downlink interference onto the antennas of the UE 120, taking into account the device orientation and arrangement of the antennas, for example, as shown in FIG. 7.

Figure 7:
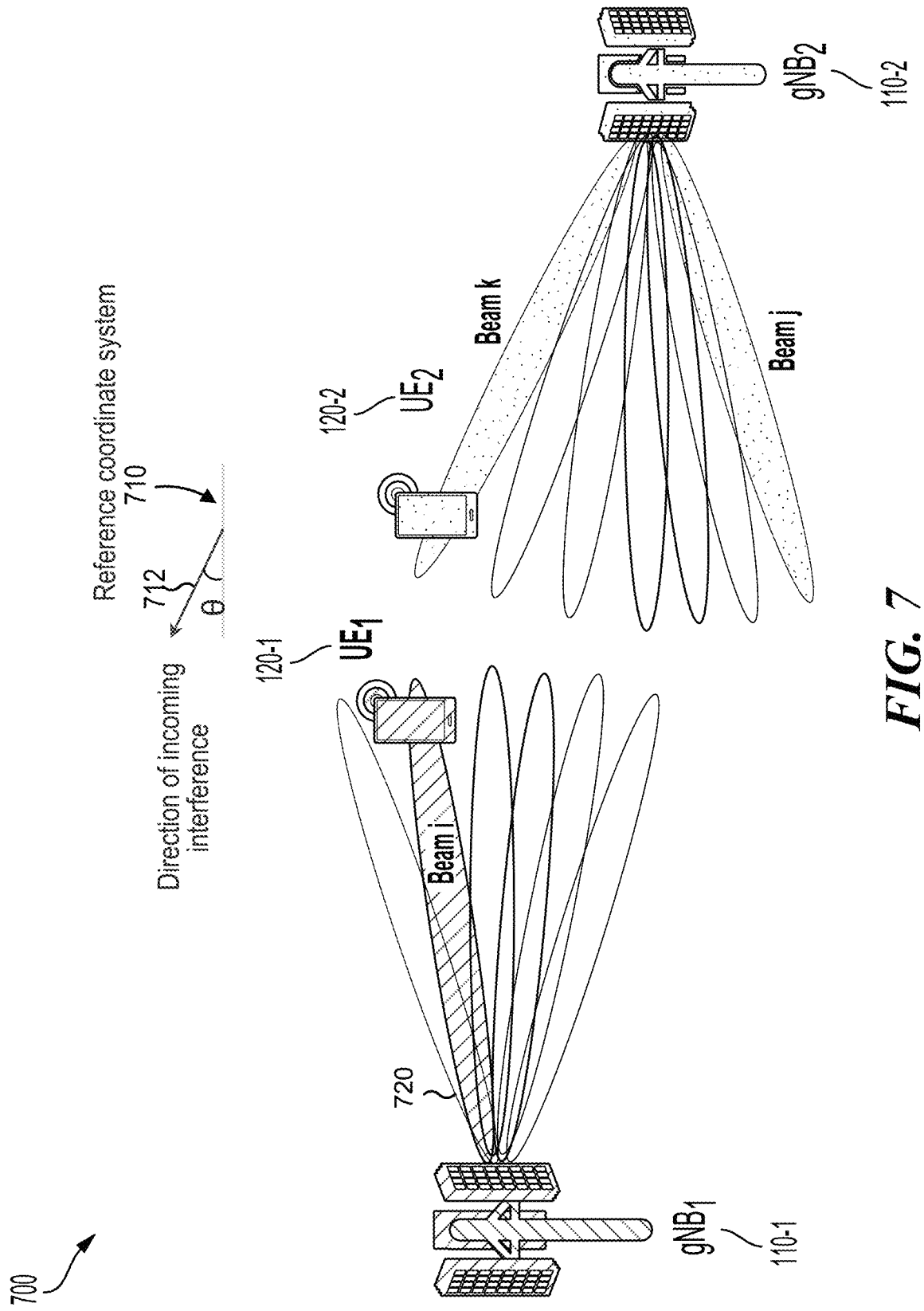
FIG. 7 is a diagram illustrating a network trained to supply location-based interference assistance information to improve estimation of an inter-cell interference spatial structure, according to aspects of the present disclosure.

FIG. 7 is a diagram illustrating a network 700 trained to supply location-based interference assistance information to improve estimation of an inter-cell interference spatial structure, according to aspects of the present disclosure. The network 700 includes a UE 120, a first base station 110-1 and a second base station 110-2. In these aspects of the present disclosure, the first base station 110-1 provides location-based interference assistance information 720 to the UE 120 across a beam i. For example, based on the location of the UE 120 relative to a reference coordinate system 710 (e.g., a globally fixed coordinate system), location-based interference assistance information 720 indicates that dominant incoming interference may be expected from a specific angle defined according to an azimuth $\theta$, and an elevation $\varphi$. Using this information, the UE 120 may account for the dominant incoming interference, for example, by performing interference cancellation during signal demodulation. In other examples, the UE 120 uses the location-based interference assistance information 720 for channel state feedback.

In this example, the reference coordinate system 710 may be specified as follows: (1) specified in a standard based on a globally fixed direction; or (2) specified as the direction of arrival of the desired signal from the serving cell. In response, the interference estimation block 630 of the UE 120 uses the location-based interference assistance information 720 to project an incoming direction onto the UE antennas, taking into account the UE orientation and arrangement of the antennas. For example, the UE 120 may be a connected vehicle configured according to a vehicle-to-everything (V2X) protocol. The connected vehicle may include an antenna at a front and rear of the connected vehicle. The location-based interference assistance information 720 enables the interference estimation block 630 to improve estimation of a downlink spatial interference structure at the UE 120. For example, the location-based interference assistance information 720 improves accuracy when used as a prior for estimating an interference covariance across the antennas of the UE 120. Alternatively, the UE 120 may use the location-based interference assistance information 720 as channel-state feedback or for demodulating received data.

As shown in FIG. 7, based on coordination, the first base station 110-1 (e.g., gNB$_1$) identifies that the second base station 110-2 (e.g., gNB$_2$) will use a beam k in a future time slot(s) and a beam j in another future time slot(s). The beam k may interfere with the beam i used to communicate between the first base station 110-1 and the UE 120. The beam j of the second base station 110-2, however, does not interfere with communication between the UE 120 and the first base station 110 over the beam i. In these aspects of the present disclosure, the first base station 110-1 predicts the incoming direction and strength of the interference at the location of the UE 120 from past learning. That is, the first base station 110-1 provides location-based interference assistance information 620 about the interference characteristics to the beam i used to communicate between the first base station 110-1 and the UE 120. For example, location-based interference assistance information 620 may indicate a dominant interference direction 712, such as a specific angle defined by the reference coordinate system 710 according to an azimuth θ, and an elevation φ. In this example, the UE 120 avoids interference from the second base station 110-2 by the first base station 110-1 scheduling the UE 120 on time slots when the second base station 110-2 does not use beam k, as well as during unused time slots of the second base station 110-2.

According to aspects of the present disclosure, the UE 120 uses location-based interference assistance information 720 while estimating an interference covariance matrix. As described, the interference covariance matrix may be referred to as a downlink interference covariance matrix. The location-based interference assistance information 720 simplifies and improves estimation of a downlink interference structure at the UE 120. The estimation becomes easier and more accurate because the location-based interference assistance information 720 may be used as a prior for the estimation of the interference covariance across antennas of the UE 120. That is, estimating of the downlink interference structure at the UE 120 is improved by using the location-based interference assistance information 720. In addition, suppressing interference across antennas of the UE 120 based on the location-based downlink interference assistance information 720 improves signal reception of the UE 120 as well as a user experience.

In FIG. 7, location-based interference assistance information 720 may indicate periodic interference. In this example, the second base station 110-2 is a neighbor base station that transmits in certain time slots while switching between the beam k and the beam j. As noted above, the second base station 110-2 periodically uses the beam k in a certain time slot(s), which interferes with communication between the first base station 110-1 and the UE 120 over beam i. In these aspects of the present disclosure, the first base station 110-1 learns that the neighbor base station 110-2 transmits in certain time slots affecting the location of the UE 120 from past learning. In these aspects, the first base station 110-1 provides this location-based interference assistance information 720 about the time slots used by the neighbor base station 110-2 to communicate over beam k. In response, the UE 120 may use this side information while estimating the interference covariance matrix. In some aspects, the location-based interference assistance information 720 improves port selection when the UE 120 is configured as a multiport device.

Figure 8:
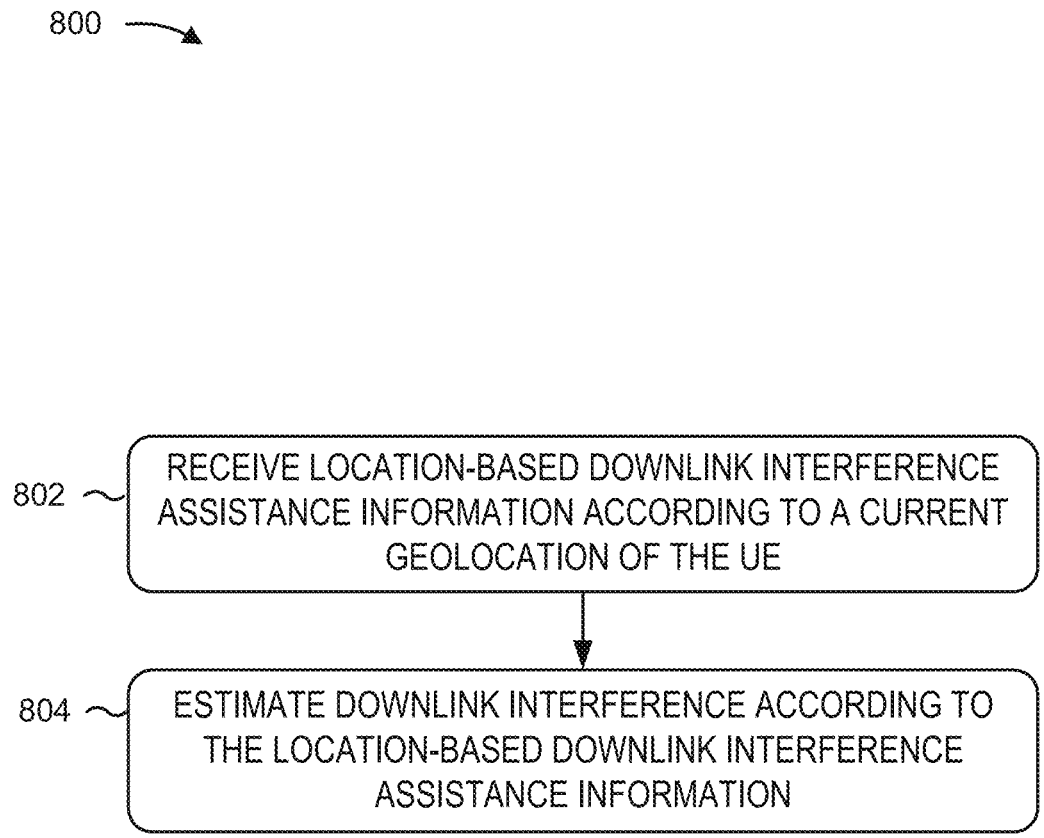
FIG. 8 is a flow diagram illustrating an example process performed, for example, by a user equipment (UE), to estimate an inter-cell interference spatial structure using location-based interference assistance information, in accordance with various aspects of the present disclosure.

FIG. 8 is a flow diagram illustrating an example process 800 to estimate an inter-cell interference spatial structure using location-based interference assistance information performed, for example, by a UE, in accordance with various aspects of the present disclosure. The example process 800 is an example of a 5G new radio (NR) base station enhancement to estimate an inter-cell interference spatial structure using location-based interference assistance information.

As shown in FIG. 8, in some aspects, the process 800 includes receiving location-based downlink interference assistance information according to a current geolocation of the UE (block 802). For example, the UE (e.g., using the antenna 252, the DEMOD/MOD 254, the MIMO detector 256, the receive processor 258, the controller/processor 280, and/or the memory 282) can receive the location-based downlink interference assistance information. In some aspects, the process 800 further includes estimating downlink interference according to the location-based downlink interference assistance information (block 804). For example, the UE (e.g., using the DEMOD/MOD 254, the MIMO detector 256, the receive processor 258, the controller/processor 280, and/or the memory 282) can estimate downlink interference according to the location-based downlink interference assistance information.

Figure 9:
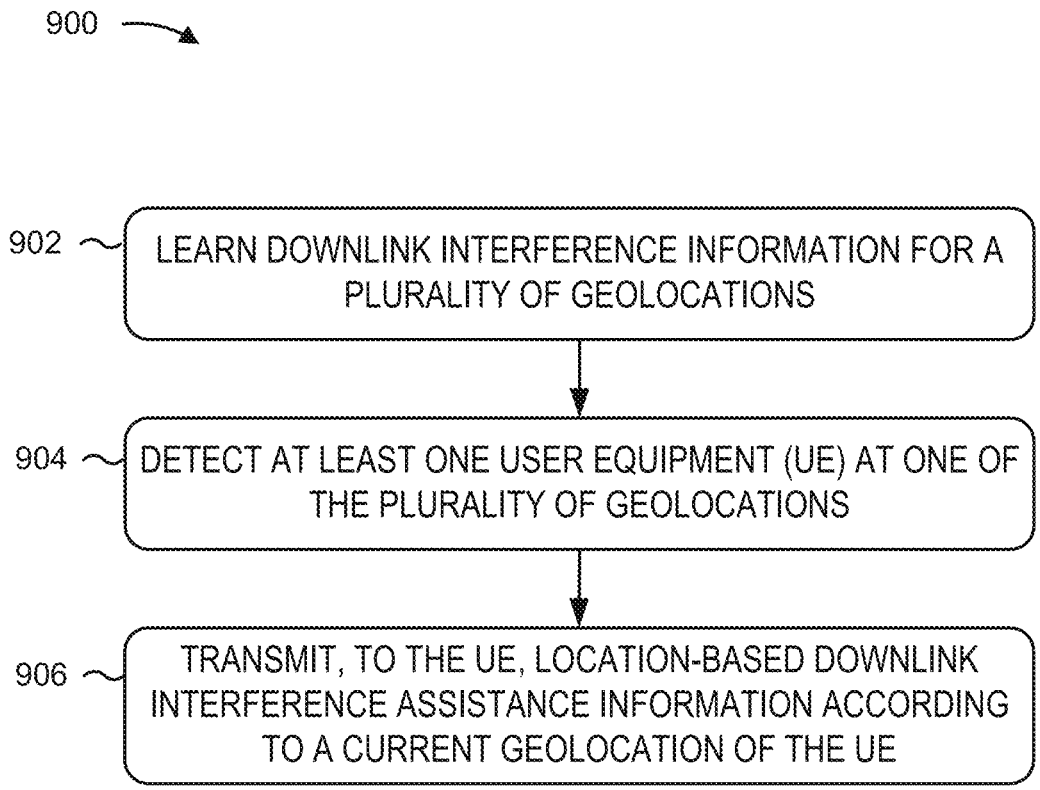
FIG. 9 is a flow diagram illustrating an example process performed, for example, by a network device, to predict location-based downlink interference assistance information, in accordance with various aspects of the present disclosure.

FIG. 9 is a flow diagram illustrating an example process 900 to predict location-based downlink interference assistance information performed, for example, by a base station, in accordance with various aspects of the present disclosure. The example process 900 is an example of a 5G new radio (NR) base station enhancement to predict location-based downlink interference assistance information.

As shown in FIG. 9, in some aspects, the process 900 includes learning downlink interference information for a plurality of geolocations (block 902). For example, the base station (e.g., using the controller/processor 240, and/or the memory 242) can learn the downlink interference information. In some aspects, the process 900 further includes detecting at least one user equipment (UE) at one of the plurality of geolocations (block 904). For example, the base station (e.g., using the antenna 234, the DEMOD/MOD 232, the MIMO detector 236, the receive processor 238, the controller/processor 240, and/or the memory 242) can detect the UE at one of the geolocations. In some aspects, the process 900 further includes transmitting, to the UE, location-based downlink interference assistance information according to a current geolocation of the UE (block 906). For example, the base station (e.g., using the antenna 234, the DEMOD/MOD 232, the TX MIMO detector 230, the transmit processor 220, the controller/processor 240, and/or the memory 242) can transmit the location-based downlink interference assistance information to the UE.

Implementation examples are described in the following numbered clauses:

1. A method of wireless communications by a user equipment (UE), comprising:
    receiving location-based downlink interference assistance information according to a current geolocation of the UE; and
    estimating downlink interference according to the location-based downlink interference assistance information.
2. The method of clause 1, in which the location-based downlink interference assistance information comprises a spatial interference pattern including an incoming direction of dominant interference and a strength of the dominant interference at the current geolocation of the UE.
3. The method of any of clauses 1-2, further comprising projecting the incoming direction of the dominant interference on to a local coordinate system of the UE based on an orientation of the UE and an arrangement of antennas of the UE.
4. The method of any of clauses 1-2, in which the incoming direction of the dominant interference is associated with time resources and/or frequency resources indicated by the interference assistance information.
5. The method of any of clauses 1-2, in which the incoming direction of the dominant interference comprises a plurality of directions.
6. The method of any of clauses 1-2, in which the incoming direction of the dominant interference is relative to a globally fixed coordinate system based on a direction of arrival of a desired signal from a serving cell.
7. The method of any of clauses 1-6, further comprising estimating a downlink interference covariance matrix across antennas of the UE based on the location-based downlink interference assistance information.
8. The method of any of clauses 1-7, further comprising suppressing interference across antennas of the UE based on the location-based downlink interference assistance information.
9. The method of any of clauses 1-8, further comprising demodulating data based on the location-based downlink interference assistance information.
10. The method of any of clauses 1-9, further comprising transmitting channel state information (CSI) feedback based on the location-based downlink interference assistance information.
11. The method of any of clauses 1-10, further comprising selecting an array of antennas based on the location-based downlink interference assistance information.
12. A method of wireless communications by a network device, comprising:
    learning downlink interference information for a plurality of geolocations;
    detecting at least one user equipment (UE) at one of the plurality of geolocations; and
    transmitting, to the UE, location-based downlink interference assistance information according to a current geolocation of the UE.
13. The method of clause 12, in which learning the downlink interference information comprises learning an incoming direction and strength of dominant interference for each of the plurality of geolocations based on historical channel state information (CSI).
14. The method of any of clauses 12-13, in which the learning further comprises communicating with another network device at another cell to determine the incoming direction of the dominant interference.
15. The method of any of clauses 12-13, in which the network device comprises a location server.
16. The method of any of clauses 12-13, in which the network device comprises a base station.
17. The method of any of clauses 12-13, in which transmitting comprises multicasting the location-based downlink interference assistance information to a group of UEs in a predetermined direction from the network device or in a geographic zone.
18. An apparatus for wireless communications by a user equipment (UE), comprising:
    means for receiving location-based downlink interference assistance information according to a current geolocation of the UE; and
    means for estimating downlink interference according to the location-based downlink interference assistance information.
19. The apparatus of clause 18, in which the location-based downlink interference assistance information comprises a spatial interference pattern including an incoming direction of dominant interference and a strength of the dominant interference at the current geolocation of the UE.
20. The apparatus of any of clauses 18-19, further comprising means for projecting the incoming direction of the dominant interference on to a local coordinate system of the UE based on an orientation of the UE and an arrangement of antennas of the UE.
21. The apparatus of any of clauses 18-19, in which the incoming direction of the dominant interference is associated with time resources and/or frequency resources indicated by the interference assistance information.
22. The apparatus of any of clauses 18-19, in which the incoming direction of the dominant interference comprises a plurality of directions.
23. The apparatus of any of clauses 18-19, in which the incoming direction of the dominant interference is relative to a globally fixed coordinate system based on a direction of arrival of a desired signal from a serving cell.
24. The apparatus of any of clauses 18-23, further comprising means for estimating a downlink interference covariance matrix across antennas of the UE based on the location-based downlink interference assistance information.
25. The apparatus of clauses 18-24, further comprising means for suppressing interference across antennas of the UE based on the location-based downlink interference assistance information.
26. The apparatus of clauses 18-25, further comprising means for demodulating data based on the location-based downlink interference assistance information.
27. The apparatus of clauses 18-26, further comprising means for transmitting channel state information (CSI) feedback based on the location-based downlink interference assistance information.
28. The apparatus of clauses 18-27, further comprising means for selecting an array of antennas based on the location-based downlink interference assistance information.
29. A user equipment (UE), comprising:
    a processor;
    a memory coupled with the processor;
    instructions stored in the memory and operable, when executed by the processor, to cause the UE:

to receive location-based downlink interference assistance information according to a current geolocation of the UE; and to estimate downlink interference according to the location-based downlink interference assistance information.

30. The UE of clause 29, in which the location-based downlink interference assistance information comprises a spatial interference pattern including an incoming direction of dominant interference and a strength of the dominant interference at the current geolocation of the UE.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communications by a user equipment (UE), comprising:
   receiving location-based downlink interference assistance information according to a current geolocation of the UE, the location-based downlink interference assistance information comprising a spatial interference pattern indicating an incoming direction of dominant interference; and
   estimating downlink interference according to the location-based downlink interference assistance information.

2. The method of claim 1, in which the location-based downlink interference assistance information further comprises a strength of the dominant interference at the current geolocation of the UE.

3. The method of claim 1, further comprising projecting the incoming direction of the dominant interference on to a local coordinate system of the LIE based on an orientation of the UE and an arrangement of antennas of the UE.

4. The method of claim 1, in which the incoming direction of the dominant interference is associated with time resources and/or frequency resources indicated by the interference assistance information.

5. The method of claim 1, in which the incoming direction of the dominant interference comprises a plurality of directions.

6. The method of claim 1, in which the incoming direction of the dominant interference is relative to a globally fixed coordinate system based on a direction of arrival of a desired signal from a serving cell.

7. The method of claim 1, further comprising estimating a downlink interference covariance matrix across antennas of the UE based on the location-based downlink interference assistance information.

8. The method of claim 1, further comprising suppressing interference across antennas of the UE based on the location-based downlink interference assistance information.

9. The method of claim 1, further comprising demodulating data based on the location-based downlink interference assistance information.

10. The method of claim 1, further comprising transmitting channel state information (CSI) feedback based on the location-based downlink interference assistance information.

11. The method of claim 1, further comprising selecting an array of antennas based on the location-based downlink interference assistance information.

12. A method of wireless communications by a network device, comprising:
   learning downlink interference information for a plurality of geolocations;
   detecting at least one user equipment (UE) at one of the plurality of geolocations; and
   transmitting, to the UE, location-based downlink interference assistance information according to a current geolocation of the UE, the location-based downlink interference assistance information comprising a spatial interference pattern indicating an incoming direction of dominant interference.

13. The method of claim 12, in which learning the downlink interference information further comprises learning a strength of dominant interference for each of the plurality of geolocations based on historical channel state information (CSI).

14. The method of claim 12, in which the learning further comprises communicating with another network device at another cell to determine the incoming direction of the dominant interference.

15. The method of claim 12, in which the network device comprises a location server.

16. The method of claim 12, in which the network device comprises a base station.

17. The method of claim 12, in which transmitting comprises multicasting the location-based downlink interference assistance information to a group of UEs in a predetermined direction from the network device or in a geographic zone.

18. An apparatus for wireless communications by a user equipment (UE), comprising:
 means for receiving location-based downlink interference assistance information according to a current geolocation of the UE, the location-based downlink interference assistance information comprising a spatial interference pattern indicating an incoming direction of dominant interference; and
 means for estimating downlink interference according to the location-based downlink interference assistance information.

19. The apparatus of claim 18, in which the location-based downlink interference assistance information further comprises a strength of the dominant interference at the current geolocation of the UE.

20. The apparatus of claim 18, further comprising means for projecting the incoming direction of the dominant interference on to a local coordinate system of the UE based on an orientation of the UE and an arrangement of antennas of the UE.

21. The apparatus of claim 18, in which the incoming direction of the dominant interference is associated with time resources and/or frequency resources indicated by the interference assistance information.

22. The apparatus of claim 18, in which the incoming direction of the dominant interference comprises a plurality of directions.

23. The apparatus of claim 18, in which the incoming direction of the dominant interference is relative to a globally fixed coordinate system based on a direction of arrival of a desired signal from a serving cell.

24. The apparatus of claim 18, further comprising means for estimating a downlink interference covariance matrix across antennas of the UE based on the location-based downlink interference assistance information.

25. The apparatus of claim 18, further comprising means for suppressing interference across antennas of the UE based on the location-based downlink interference assistance information.

26. The apparatus of claim 18, further comprising means for demodulating data based on the location-based downlink interference assistance information.

27. The apparatus of claim 18, further comprising means for transmitting channel state information (CSI) feedback based on the location-based downlink interference assistance information.

28. The apparatus of claim 18, further comprising means for selecting an array of antennas based on the location-based downlink interference assistance information.

29. A user equipment (UE), comprising:
 a processor;
 a memory coupled with the processor; and
 instructions stored in the memory and operable, when executed by the processor, to cause the UE:
  to receive location-based downlink interference assistance information according to a current geolocation of the UE, the location-based downlink interference assistance information comprising a spatial interference pattern indicating an incoming direction of dominant interference; and
  to estimate downlink interference according to the location-based downlink interference assistance information.

30. The UE of claim 29, in which the location-based downlink interference assistance information further comprises a strength of the dominant interference at the current geolocation of the UE.

\* \* \* \* \*